UNITED STATES PATENT OFFICE.

BENJAMIN F. ULMER, OF SAVANNAH, GEORGIA.

IMPROVEMENT IN MEDICAL COMPOUNDS.

Specification forming part of Letters Patent No. 152,534, dated June 30, 1874; application filed May 16, 1874.

*To all whom it may concern:*

Be it known that I, BENJAMIN F. ULMER, of Savannah, in the county of Chatham and State of Georgia, have invented a new and useful Improvement in Medical Compounds, of which the following is a specification:

This invention consists of a composition composed of the ingredients hereinafter named, combined in about the proportions specified, viz: Ground dandelion, two pounds; ground butternut-bark, one pound; ground senna, one and a half pound; ground serpentaria, one-fourth pound; ground star aniseed, one-eighth pound; ground fennel-seed, one-eighth pound; ground coriander-seed, one-fourth pound.

The above-mentioned ingredients are thoroughly mixed together and moistened with pure glycerine, one and a half pint; water, two pints; cologne-spirits, four pints. Then pack the above closely in a percolator, and macerate for the space of thirty-six hours; then add diluted cologne-spirits until three and a half gallons have passed through the percolator, and then add eighty-two fluid-ounces of sirup prepared from the domestic black-root of the Southern States, (botanical name, *pterocaulon pycnostachyum*.)

I do not confine myself to the precise proportion of each of the above ingredients, as they may be varied somewhat without departing from my invention.

This compound is administered as a liver-corrector or vegetable aperient, and is found extremely useful in all bilious complaints.

Having thus described my invention, I claim as new and desire to secure by Letters Patent—

The medical compound above described, substantially as and for the purposes specified.

BENJ. F. ULMER.

Witnesses:
E. P. JONES,
JOHN CREAN.